United States Patent [19]

Salway

[11] 4,018,197
[45] Apr. 19, 1977

[54] SPARK IGNITION SYSTEMS FOR INTERNAL COMBUSTION ENGINES

[75] Inventor: Peter Hugh Salway, Birmingham, England

[73] Assignee: The Lucas Electrical Company Limited, Birmingham, England

[22] Filed: Aug. 19, 1974

[21] Appl. No.: 498,874

[30] Foreign Application Priority Data

Sept. 12, 1973 United Kingdom ............ 42819/73

[52] U.S. Cl. .................... 123/117 D; 123/146.5 A
[51] Int. Cl.² .......................................... F02P 1/00
[58] Field of Search ................ 123/148 E, 146.5 A, 123/117 R, 117 D

[56] References Cited

UNITED STATES PATENTS

| | | | |
|---|---|---|---|
| 3,454,871 | 7/1969 | Nolting | 123/148 E |
| 3,696,303 | 10/1972 | Hartig | 123/148 E |
| 3,738,339 | 6/1973 | Huntzinger | 123/148 E |
| 3,749,073 | 7/1973 | Asplund | 123/148 E |
| 3,752,139 | 8/1973 | Asplund | 123/117 R |
| 3,757,755 | 11/1973 | Carner | 123/148 E |
| 3,903,857 | 9/1975 | Honig et al. | 123/117 R |
| 3,904,856 | 9/1975 | Monpetit | 123/32 EA |
| 3,921,610 | 11/1975 | Hartig | 23/148 E |
| 3,927,648 | 12/1975 | Kawai et al. | 123/117 R |
| 3,935,846 | 2/1976 | Zelenka | 123/117 R |
| 3,942,491 | 3/1976 | Seite et al. | 123/117 R |

Primary Examiner—C. J. Husar
Assistant Examiner—Paul Devinsky

[57] ABSTRACT

A spark ignition system for a vehicle has a memory device receiving inputs representing engine parameters and producing an output representing the crankshaft position at which a spark is to be produced. This output is compared with a signal representing the actual crankshaft position starting from a datum position, and a common transducer is used to provide the required engine speed signal and crankshaft position signal.

7 Claims, 1 Drawing Figure

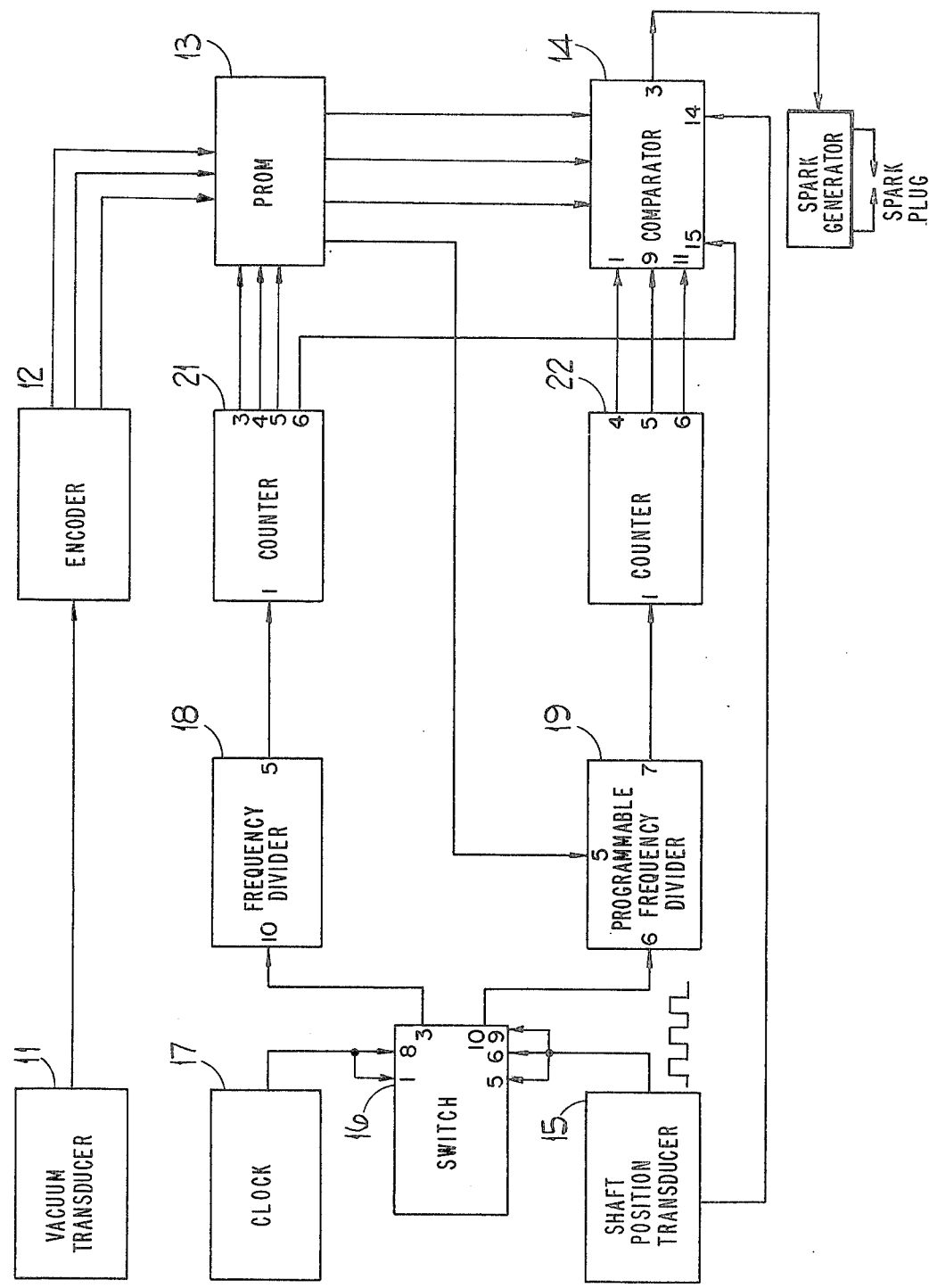

SPARK IGNITION SYSTEMS FOR INTERNAL COMBUSTION ENGINES

This invention relates to spark ignition systems for internal combustion engines.

The invention resides in a spark ignition system including a memory device which receives inputs representing engine speed and at least one further engine parameter and produces an output representing the crankshaft position at which a spark is to be produced, this output being compared with a signal representing crankshaft position starting from a datum position, a common transducer being used to provide the required engine speed and crankshaft position signals.

The accompanying drawing is a block diagram illustrating one example of the invention.

Referring to the drawing, an engine incorporates a vacuum transducer 11 producing an output representing manifold depression, this output being fed through a digital encoder 12 to a memory unit 13 which also receives an input representing the rotational speed of the engine. Alternatively, the transducer 11 could itself produce a digital output which is fed directly to the unit 13. The memory unit 13, which is of known form, is programmed so that it produces an output dependent upon the two inputs it receives, and representing the instant at which a spark is to be produced. The way in which the memory 13 is programmed is empirical, and depends upon the engine.

The output from the memory 13 is fed to a comparator 14 which also receives a signal representing the position of the engine crankshaft. When the engine crankshaft is in the correct position, the comparator 14 produces an output to a spark generating circuit to produce the spark. The spark generating circuit can also be entirely conventional.

Associated with the crankshaft of the engine is a transducer 15 which produces an output voltage having two levels, conveniently referred to as 1 and 0 respectively. The arrangement is such that as each piston passes through the fully retarded ignition timing position, the output from the transducer 15 changes from 0 to 1. As each piston moves into its cylinder, then the output changes from 1 to 0 at a predetermined position, which typically is 30° of cam shaft rotation before the fully retarded position. Thus, as each piston moves on its compression stroke, the output from the transducer 15 changes from 1 to 0 well before the maximum required advance position, and then changes back to 0 at the fully retarded ignition position.

The output from the transducer 15 is fed to an electronic two-way switch 16 which also receives an input from an oscillator 17 operating at a predetermined frequency. The switch 16 provides an input to one of a pair of frequency dividers 18, 19, the arrangement being such that when the output from the transducer 15 is zero, the switch 16 is coupled to the divider 19, and when the output from the transducer 15 is 1, the switch 16 is coupled to the divider 18. The divider 18 provides an input to a counter 21, which in turn provides the required speed signal to the memory 13. It will be appreciated that whenever the output from the transducer 15 is 1, the fixed frequency ocillator 17 provides an input to the counter 21, which will therefore produce an output dependent upon engine speed. The divider 18 is set in accordance with the number of cylinders of the engine.

At the instant when a piston passes through the 30° position, the oscillator 17 will be coupled to the divider 19, and de-coupled from the divider 18. At that point in time, the output from the memory unit 13 will indicate to the comparator the position of the piston at which a spark is to be produced, measured from the 30° position. The oscillator 17 then counts into the counter 22, which provides an input to the comparator 14, and when the two inputs to the comparator 14 are equal, a spark is produced as previously explained. It will be appreciated that if, by way of example, 2° of advance are required, then the input to the comparator 14 from the memory will indicate that 28° of cam shaft angle are required before the spark is produced.

It will be appreciated that in the arrangement described above, since the oscillator 17 is coupled to the comparator 14 at the appropriate time, the comparator 14 compares time intervals, as represented by the pulses from the oscillator 17, with the signal it receives from the memory unit 13. The memory unit 13 must therefore be programmed appropriately, it being understood that at different speeds, the same output from the memory 13 could result in different advance characteristics, because the time intervals represented by the output from the oscillator 17 are fixed. This is the preferred arrangement, but it is possible for the switch 16 to connect the transducer 15 to the comparator 14 at the appropriate time, in which case the output from the memory 13 to the comparator 14 will indicate the actual position at which a spark is to be produced.

In most engines, there is a range of engine speeds, usually low engine speeds, at which full retarded ignition is required. The counter 21 is arranged to produce a secondary output within such a speed range, this output being fed to the comparator 14 as shown in the drawing. When the comparator 14 receives this output from the counter 21, it produces an output to produce a spark only at the full retarded position.

It will be appreciated that the counter 22 measures the position of the crank shaft with an accuracy determined by the frequency of the oscillator 17. However, the frequency of the oscillator 17 is limited by the capacity of the counter 22. The accuracy is improved, as shown in the drawing, by providing an input from the memory 13 to the frequency divider 2. The divisor of the divider 19 is then changed in accordance with the output of the memory 13. At high engine speeds, the counter 22 will be connected to the oscillator 17 for a relatively short period of time, and so the divisor is kept low. At low engine speeds, the counter 22 is connected to the oscillator 17 for a relatively long period of time, and so the memory 13 is programmed to increase the divisor for low engine speeds. Alternatively, separate frequencies, not related to a single fundamental could be used.

Although in the example described the oscillator 17 serves two functions, clearly two oscillators could be used for the two functions respectively. Also, the signal representing crankshaft position could be obtained from a device which produces an output dependent on crankshaft angle.

I claim:

1. A spark ignition system for an internal combustion engine comprising the combination of an engine having at least one spark plug, an engine driven transducer producing a pulse train at a frequency dependent on the speed of the engine, speed computing means connected to said transducer and periodically operating to produce a first multi-bit digital signal, sensor means for producing a second multi-bit digital signal, corresponding to another engine operating parameter, an empirically programmed read only digital memory device having input terminals connected to said speed computing sensor means and to said means and having output terminals for producing a third multi-bit digital output signal determined by the first and second multi-bit digital input signals supplied thereto, an engine shaft position computing means connected to said transducer and producing a forth multi-bit digital output signal varying with the displacement of the transducer from a datum position, a comparator connected to the read only digital memory device and the position computing means and producing a single pulse trigger signal output when the instantaneous value of the fourth multi-bit digital output signal from the position computing means is equal to the third multi-bit digital output signal from the read only digital memory device, and ignition control means connected to said comparator and to said spark plug so as to be triggered into producing a spark at said spark plug by said trigger output from the comparator.

2. A system as claimed in claim 1 including an oscillator transmitting pulses of fixed frequency to generate the signal representing engine speed, the engine speed being a count of 6 frequency pulses from said oscillator, the count being taken between two predetermined positions set by said engine driven transducer.

3. A system as claimed in claim 1 including oscillator means transmitting pulses of fixed frequency to generate the signal representing crank-shaft position starting from a datum position, said signal representing crank-shaft position being a count of fixed frequency pulses from said oscillator starting from said datum position.

4. A system as claimed in claim 1 including oscillating means for generating a signal representing engine speed as a count of fixed frequency pulses, said count being taken between two pre-determined positions set by said engine driven transducer, said oscillating means also generating a signal representing crank-shaft position starting from a datum position as a count of fixed frequency pulses from said oscillating means starting from said datum position; and switching means operated by said transducer for transmitting the engine speed and crank-shaft position signals.

5. A system as claimed in claim 4 wherein said datum position is one of said two predetermined positions of said count.

6. A system as claimed in claim 3 wherein said transducer generates pulses corresponding to the crank-shaft angle, said signal representing crank-shaft positions starting from a datum position being derived from said pulses generated by said transducer.

7. A system as defined in claim 5 wherein said transducer generates pulses corresponding to the crank-shaft angle, said signal representing crank-shaft position starting from a datum position being derived from said pulses generated by said transducer.

* * * * *